Patented July 11, 1950

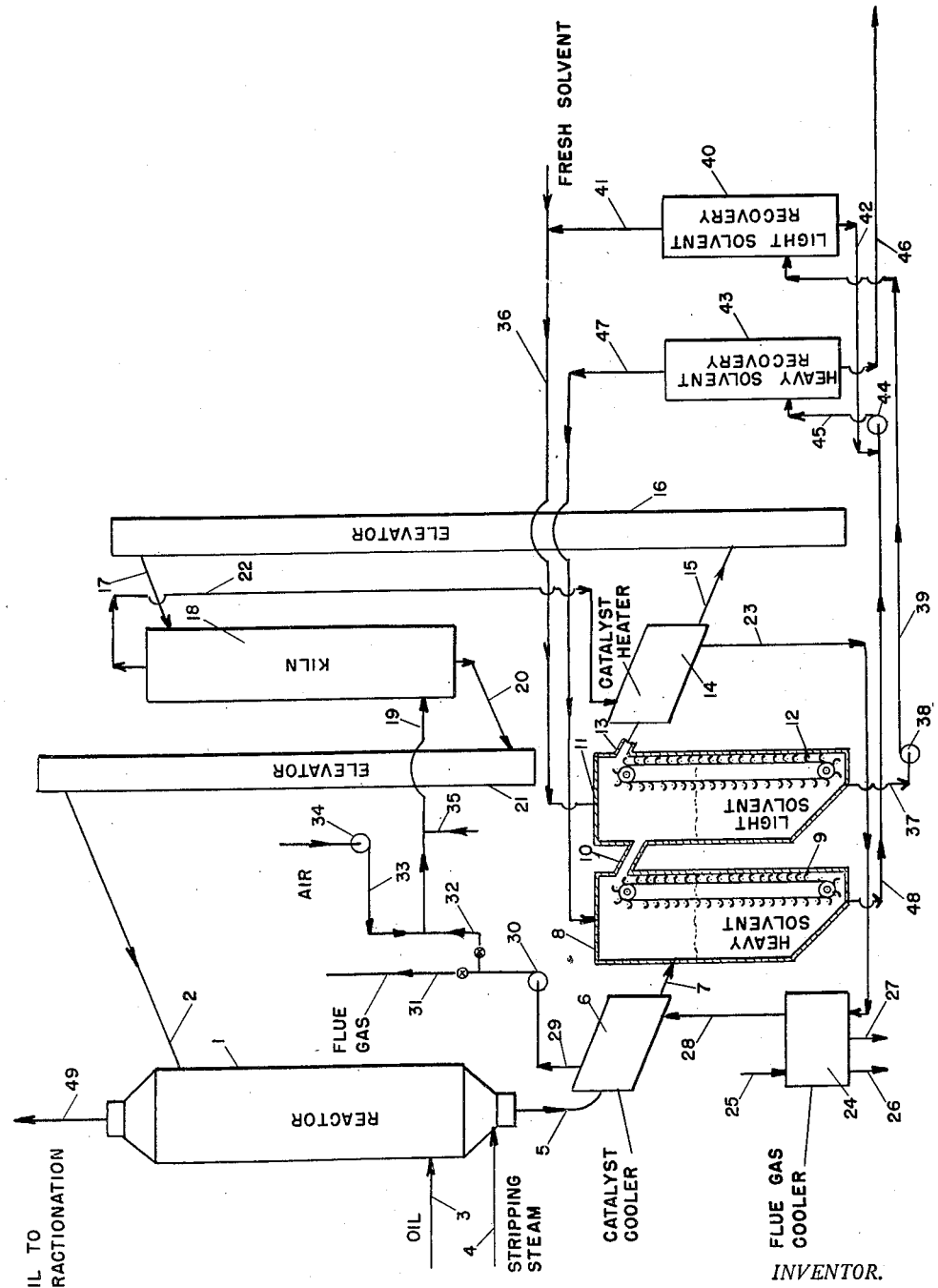

2,515,062

UNITED STATES PATENT OFFICE 2,515,062

REGENERATION OF HYDROCARBON CONVERSION CATALYST BY SOLVENT WASHING

Reading Barlow Smith, Hammond, Ind., assignor to Sinclair Refining Company, New York, N. Y., a corporation of Maine Application May 3, 1947, Serial No. 745,742

3 Claims. (Cl. 196—52)

This invention relates to the pyrolytic conversion of hydrocarbons and, more particularly, to pyrolytic conversion processes employing a catalyst. The process is applicable to various methods of operation, including those employing moving or fixed beds of pelleted or coarse grained catalyst and also those employing more finely divided, or powdered, catalyst, for instance, fluid catalyst processes.

In such pyrolytic conversion processes, the catalyst becomes fouled by heavy coke-like hydrocarbons deposited thereon, resulting in greatly diminished catalytic activity. To restore its activity, the catalyst is periodically regenerated, usually by burning off the carbonaceous deposit.

The burning of the hydrocarbon deposits from the catalyst has resulted in considerable economic loss to the refiner and yet the cost of fresh catalyst has necessitated its regeneration and reuse.

My present invention provides an improved catalytic process for the pyrolytic conversion of hydrocarbons adapted to continuous or intermittent operation and comprising a plurality of steps so coordinated as to constitute a unitary operation in which a charge of catalyst is repeatedly used and intermittently regenerated and in which all, or at least a large proportion, of the hydrocarbons deposited on the catalyst during the reaction, is conserved.

In accordance with my present invention, I recover the hydrocarbons from the spent catalyst by dissolving the hydrocarbons deposited thereon in a suitable organic solvent, advantageously an aromatic solvent such as nitrobenzene or phenol, either alone, or admixed with a detergent, and separating the dissolved hydrocarbons from the solvent by conventional methods, fractional distillation, for instance. In addition to the solvents just mentioned, various other common tar solvents, or mixtures thereof, free from catalytic poisons, may be used for this purpose. Suitable solvents include light distillate fractions from the conversion process. Detergents which may be used with advantage in conjunction with the solvents include sodium petroleum sulfonates, potassium petroleum sulfonates, calcium petroleum sulfonates, and barium petroleum sulfonates.

In processes employing a fluid catalyst, or moving bed catalyst, the catalyst is, in accordance with my present invention, withdrawn from the reaction zone, preferably stripped of readily vaporizable hydrocarbons, by steam stripping, for instance, and then submerged in, or otherwise washed with, the solvent or solvent mixture. Prior to contact with the solvent, it is usually desirable to cool the catalyst to a temperature such that substantial vaporization of the solvent will not occur. The extent of cooling will, of course, depend upon the characteristics of the particular solvent used. The tarry matter is more readily dissolved from the catalyst at elevated temperature and accordingly unnecessary cooling should be avoided.

In a particularly desirable method of operation, hereinafter described, the catalyst is successively submerged in two or more bodies of, or otherwise washed with, progressively lighter solvents, for the more thorough removal from the catalyst of hydrocarbons and heavy hydrocarbon-saturated solvents.

Catalyst separated from the solvent is freed of absorbed solvent, heated and returned to the reaction zone for reuse. Or, in the case of a fixed catalyst bed operation, the catalyst is treated by passing the solvent through the bed.

In addition to the recovery of valuable absorbed hydrocarbons, my improved process has the advantage of avoiding the customary high regeneration temperatures usually encountered in the burning of the carbonaceous material from the catalyst and the danger of overheating of the catalyst.

It is not generally possible completely to regenerate the catalyst by my process of dissolving hydrocarbons therefrom. Usually there is present on the spent catalyst carbonaceous or coke deposits which resist solution in conventional solvents. For removal of these coke deposits it is usually necessary to subject the catalyst, after the solvent treatment, to customary regeneration by blowing with air. However, by reason of the removal of heavy hydrocarbons and soluble tarry material, much less severe burning is required, with less danger of overheating the catalyst.

Usually there is sufficient residual combustible matter on the catalyst to supply the necessary heat to raise the catalyst to the reaction temperature. Otherwise, the regenerated catalyst may be heated to the desired temperature by the burning of fuel from some other source.

The foregoing and other advantages derived from my invention will appear from the following detailed description of its application to a moving bed type of operation with reference to the accompanying drawing which represents, conventionally and somewhat diagrammatically, a flow diagram of the operation.

Referring more particularly to that embodiment of my invention shown in the accompanying drawing, the apparatus indicated by the reference numeral 1 represents a generally cylindrical reactor of conventional type. The catalyst is introduced into a upper zone of the reactor through conduit 2 and gravitates downwardly therethrough countercurrent to preheated charge oil introduced through line 3, whereby conversion of the hydrocarbons occurs and carbonaceous material is deposited on the catalyst. Steam, or other stripping medium, is injected into the lower portion of the reaction chamber through line 4 and passes upwardly through the catalyst, stripping readily vaporizable hydrocarbons from the spent catalyst in the lower portion of the chamber.

Spent catalyst is withdrawn from the bottom of the reaction chamber through conduit 5 to the catalyst cooler 6 through which the catalyst passes in contact with a cooling medium subsequently described and out through conduit 7 to the heavy solvent chamber 8. The incoming catalyst falls into a body of liquid solvent maintained in the chamber which dissolves from the catalyst the heavy hydrocarbons deposited thereon. The catalyst settles to the bottom of the chamber and is picked up by a conveyor 9, for instance, a bucket conveyor such as shown, or other conventional type conveyor, and carried to the top of the chamber and dumped into conduit 10 through which it gravitates into light solvent chamber 11.

In chamber 11, a body of lighter liquid solvent is maintained, adapted to dissolve the heavy solvent from the catalyst along with further heavy hydrocarbons. The entering catalyst falls downwardly through the body of solvent and is picked up by conveyor 12, such as just described, and carried to the top of the chamber where it is dumped into conduit 13 leading into the catalyst heater 14.

The catalyst passes through the heater in contact with a gaseous heating medium, subsequently described, and out through conduit 15 into the lower end of elevator 16 of conventional type. The catalyst is carried upwardly through the elevator and emptied into conduit 17 through which is gravitates into the kiln or heater 18. The catalyst gravitates downwardly through the kiln countercurrent to a stream of air, or other oxidizing gas, introduced into the lower end of the kiln through line 19.

Upon contact of the oxygen-containing gas with the heated catalyst, residual carbon deposited on the catalyst is burned off, the catalyst being heated to a high temperature by the combustion. Hot catalyst is withdrawn from the lower end of the kiln through line 20 into the lower end of elevator 21, of conventional type, and is carried up through the elevator and emptied into conduit 2 through which it gravitates back to the reactor, as previously described.

Hot products of combustion pass from the top of the kiln through line 22 and through catalyst heater 14 in contact with catalyst passing from the solvent chamber 11, heating the catalyst and vaporizing any residual solvent contained therein. The flue gases and vaporized solvents pass from the catalyst heater through line 23 to flue gas cooler 24 in which it is passed in indirect heat exchange with a cooling medium, water, for instance, introduced to the cooler through line 25 and withdrawn through line 26. Solvent condensed from the flue gas mixture is withdrawn from the cooler through line 27 and may be returned to the system for reuse.

The cooled flue gases pass from the cooler through line 28 and pass in direct contact with the catalyst in cooler 6, passing from the cooler through line 29 to blower 30 and through line 31 to a stack, or precipitator, not shown.

Where a considerable amount of residual carbon remains on the catalyst, it may be desirable to dilute the air passing to the kiln with flue gases for retarding the rate of combustion. For this purpose, a portion of the flue gases may be diverted from line 31 through line 32 to line 19, air being supplied to line 19 through line 33 by means of blower 34.

Where the amount of carbon on the catalyst being supplied to kiln 18 is insufficient to support combustion necessary to heat the catalyst to the desired temperature and to supply hot flue gases for use, as previously described, a gaseous fuel may be introduced into line 19 through line 35, forming a combustible mixture with the air introduced through line 33, and is burned within the kiln to supply the necessary heat.

Fresh solvent of the type previously described is charged to the light solvent chamber 11 through line 36 and is withdrawn from the bottom of the chamber through line 37 and, by means of pump 38, is passed through line 39 to the light solvent recovery system 40 in which a portion of the light solvent is separated, by conventional means, and returned to line 36 through line 41.

The remainder of the solvent, having heavier hydrocarbons dissolved therein, is passed from the recovery system 40 through line 42 and passed to the heavy solvent recovery system diagrammatically represented at 43 by means of pump 44 and line 45.

In the heavy solvent recovery system the solvent is separated from the hydrocarbons recovered from the catalyst, the latter being withdrawn through line 46 and the solvent being passed through line 47 to the heavy solvent chamber 8. The heavy solvent, together with hydrocarbons dissolved from the catalyst, is passed through line 48 to pump 44 and returned to the heavy solvent recovery system, together with light solvent from the light solvent recovery system 40.

Products of conversion are withdrawn from the upper portion of the reactor through line 49 and passed to a fractionating system, not shown in the drawing.

In the foregoing description, I have shown the use, in the first solvent chamber, of the solvent previously used in the subsequent solvent extraction. In such operation, residual solvent having heavier hydrocarbons dissolved therein is, to a major extent, washed from the catalyst in the subsequent solvent bath. It will be understood, however, that the invention contemplates the use of one or more solvent baths in which like or different solvents may be used.

Heavy hydrocarbons, recovered from the catalyst in accordance with my present invention, are generally highly aromatic and are of considerable commercial value. The amount of hydrocarbons thus recovered will depend, to a major extent, upon the type of hydrocarbon being processed and conditions maintained in the reaction zone. Where more than one solvent chamber is used, as shown in the drawings for instance, the hydrocarbons recovered from the catalyst may be separately recovered in the respective solvent recovery systems, where desired.

As previously indicated, my invention is applicable generally to pyrolytic conversion processes involving solid catalysts. Further, it is applicable to the use of various types of catalyst, as previously indicated.

The catalyst employed may, for instance, be of the type conventionally used in hydrocarbon conversion processes, for instance, a silica-alumina type catalyst in pelleted, granular, or powdered form.

Conditions under which the conversion is effected may, likewise, be those conventionally used and, as understood by the art, the optimum temperatures and pressures will depend primarily upon the type of feed stock used, the particular catalyst employed and the reaction desired.

In the cracking of gas oil, for instance, the reaction temperature may, with advantage be within the range of 750 to 950° F., the reactor pressure within the range of 5 to 25 pounds per square inch, and the ratio of liquid oil to catalyst within the range of 0.2 to 3 by volume, where pelleted catalyst is employed.

The temperature of the catalyst in the kiln should be kept below that at which the particular catalyst being used is damaged. Usually, temperatures up to about 1,200° F. may be employed, but, by reason of the fact that a large proportion of the carbonaceous material is removed from the catalyst by solvent extraction, the temperature within the kiln may usually be maintained considerably below 1,200° F.

Where a detergent is used, it may, for instance, be premixed with a solvent introduced through line 36. The optimum proportion of detergent used will depend upon the particular solvent, the particular detergent used and the nature and amount of hydrocarbon to be removed from the catalyst.

I claim:

1. In a catalytic process for the conversion of hydrocarbons wherein the catalyst is repeatedly used in the conversion reaction and intermittently regenerated by the removal of carbonaceous deposits therefrom, the step of removing from the catalyst heavy hydrocarbons deposited thereon during the conversion reaction by washing the catalyst with an organic solvent containing as a detergent a petroleum sulfonate of a metal of the group consisting of sodium, potassium, calcium and barium in a plurality of successive washing operations.

2. In a catalytic process for the conversion of hydrocarbons wherein the catalyst is repeatedly used in the conversion reaction and intermittently regenerated by the removal of carbonaceous deposits therefrom, the improvement which comprises, dissolving from the catalyst heavy hydrocarbons deposited thereon during its use in the conversion reaction by washing the catalyst with an organic solvent containing as a detergent a petroleum sulfonate of a metal of the group consisting of sodium, potassium, calcium and barium, separating the solvent, and hydrocarbons dissolved therein, from the catalyst in a plurality of successive washing operations, burning-off from the catalyst residual carbon by contact with air at combustion temperature and reusing the catalyst in the conversion reaction.

3. In a catalytic process for the conversion of hydrocarbons wherein the catalyst is repeatedly used in the conversion reaction and intermittently regenerated by the removal of carbonaceous deposits therefrom, the step of removing from the catalyst heavy hydrocarbons deposited thereon during the conversion reaction by washing the catalyst with an organic solvent containing as a detergent a petroleum sulfonate of a metal of the group consisting of sodium, potassium, calcium, and barium.

READING BARLOW SMITH.

REFERENCES CITED

The following references are of record in the file of this patent:

UNITED STATES PATENTS

| Number | Name | Date |
|---|---|---|
| 1,356,631 | Kennedy | Oct. 26, 1920 |
| 1,905,087 | Goebel | Apr. 25, 1933 |
| 1,908,338 | Franceway | May 9, 1933 |
| 1,933,508 | Peck | Oct. 31, 1933 |
| 2,333,851 | Egloff | Nov. 9, 1943 |
| 2,370,816 | Schonberg | Mar. 6, 1945 |

FOREIGN PATENTS

| Number | Country | Date |
|---|---|---|
| 540,408 | Great Britain | Oct. 16, 1941 |